Figure 1:
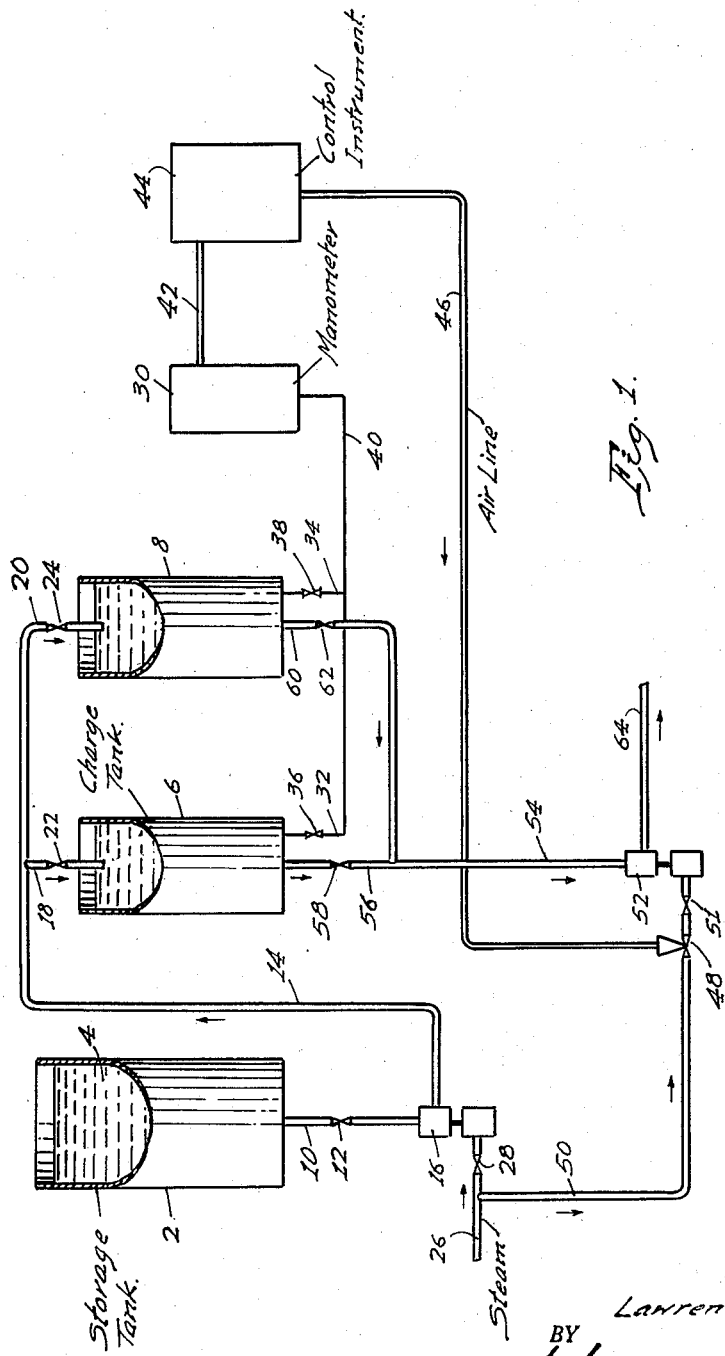

Aug. 18, 1959     L. J. KIRBY     2,899,969
CONTROLLING FLOW RATES

Filed March 9, 1954     3 Sheets-Sheet 1

INVENTOR.
Lawrence J. Kirby.
BY
Horace S. Cooke
ATTORNEY

Aug. 18, 1959 — L. J. KIRBY — 2,899,969
CONTROLLING FLOW RATES
Filed March 9, 1954 — 3 Sheets-Sheet 2
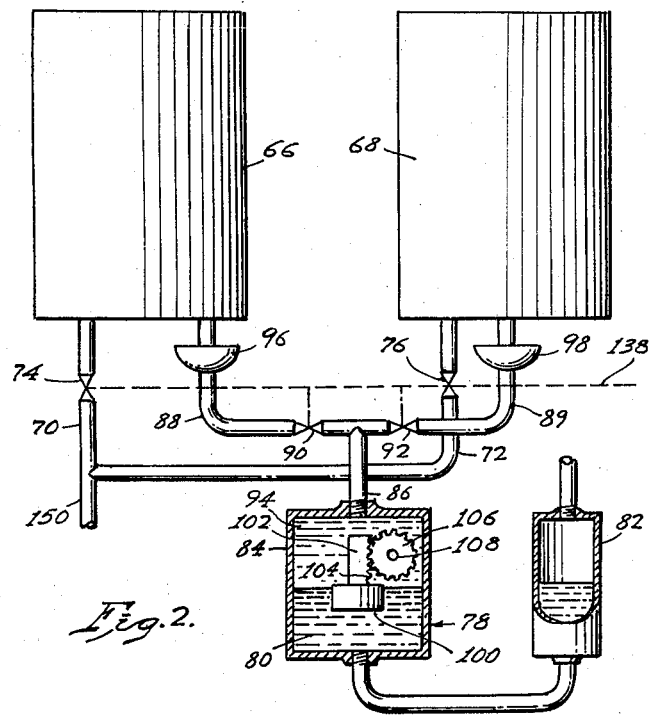
Fig. 2.
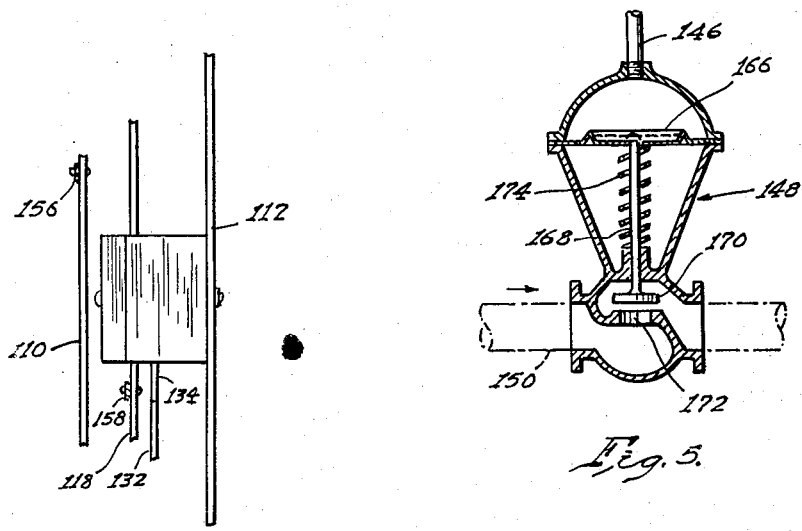
Fig. 4.
Fig. 5.
INVENTOR.
Lawrence J. Kirby.
BY
Horace H. Cooke
ATTORNEY:-

United States Patent Office 2,899,969
Patented Aug. 18, 1959

2,899,969

CONTROLLING FLOW RATES

Lawrence J. Kirby, Port Arthur, Tex., assignor to Gulf Oil Corporation, Pittsburgh, Pa., a corporation of Pennsylvania Application March 9, 1954, Serial No. 415,033

10 Claims. (Cl. 137—8)

This invention relates to a method of and means for controlling flow rates, and, more particularly, to a method of and means for controlling weight rate of flow of liquids.

Conventional means for controlling rate of flow of liquids have generally been based upon volume rate of flow and have proved satisfactory in cases where the liquid itself presents no particular problem of flow and accurate determinations need not be made. Volume rate of flow, however, is not always very satisfactory in cases where a variation in density, viscosity and/or temperature of the liquid is a problem or the quantities of liquid being measured are small. True weight rate of flow has been accomplished for materials, such as dry solids, through such expedients as mechanism involving conveyor means passing over a weighing device, but such means are generally not applicable to fluids.

The method of and means for controlling the rate of flow of liquids in accordance with my invention is characterized by the fact that the rate of flow of liquid from a receptacle or container is automatically controlled to obtain a predetermined weight rate of flow therefrom. More specifically, the weight rate of flow of liquid from a receptacle containing a selected amount of said liquid is continuously controlled by continuously measuring the hydrostatic head of said liquid in said receptacle, employing an actuating fluid under pressure to control the flow of said liquid from said receptacle, and continuously varying the pressure of said actuating fluid in accordance with changes in said hydrostatic head. While my invention is applicable in controlling the weight rate of flow of a selected amount of liquid from a single receptacle or simultaneously from a plurality of such receptacles, after which the receptacle or receptacles are again filled with a selected amount of liquid and the operation can again be started, I prefer to discharge one receptacle of substantially its entire liquid contents and substantially immediately thereafter switch to another receptacle containing a selected amount of liquid. In this way the operation can be made substantially continuous.

The hydrostatic head of the liquid in the receptacle is continuously measured throughout the liquid discharging operations in any convenient manner. In the preferred embodiment of my invention, I employ a mercury U-tube differential pressure measuring device.

The liquid is removed from the receptacle through a liquid discharge line either by gravity flow or by positive means, such as pump means. Means, such as a control valve, is employed to control the flow of liquid from the receptacle through the liquid discharge line. In the event circumstances permit the use of gravity flow in removing a selected amount of liquid from the receptacle, the control valve can be located in the liquid discharge line. When positive means, such as a pump, is employed in the operation, the control valve can be located in the line supplying power to the pump, the pump suction line or the pump discharge line. In addition, the control valve could also be located in a bypass line joining the pump discharge and suction line or in a line from the pump discharge line to the receptacle. In each of the two latter cases, the pump may be operated at constant speed and the control valve would allow, any liquid in excess of the desired quantity to flow back to the pump suction line or the line from the pump discharge line to the receptacle, respectively.

The control means identified above, regardless of its location, is actuated by a fluid, such as air, under pressure, which pressure is varied in accordance with changes in the hydrostatic head of the liquid in the receptacle. More specifically, the changes in hydrostatic head of the liquid in the receptacle, as determined, for example, by a manometer, are transmitted to a pressure indicator, such as a pressure indicating arm, and the latter, in turn, is associated with the actuating fluid in such manner as to continuously vary the pressure of the actuating fluid in response to changes in the hydrostatic head of the liquid.

Still more specific and in accordance with an especially preferred embodiment of my invention, an index arm is employed in combination with the pressure indicator, and means, preferably cam means, is provided to move said index arm in accordance with the desired weight rate of flow of liquid from the receptacle. As previously noted, the pressure indicator, preferably in the form of a pressure indicating arm, is moved in response to the change in hydrostatic head of the liquid in the receptacle. This latter movement, as well as that resulting from movement of the index arm, is then transmitted to the fluid actuating means, with the result that the pressure of the actuating fluid is continuously varied.

Figure 3:
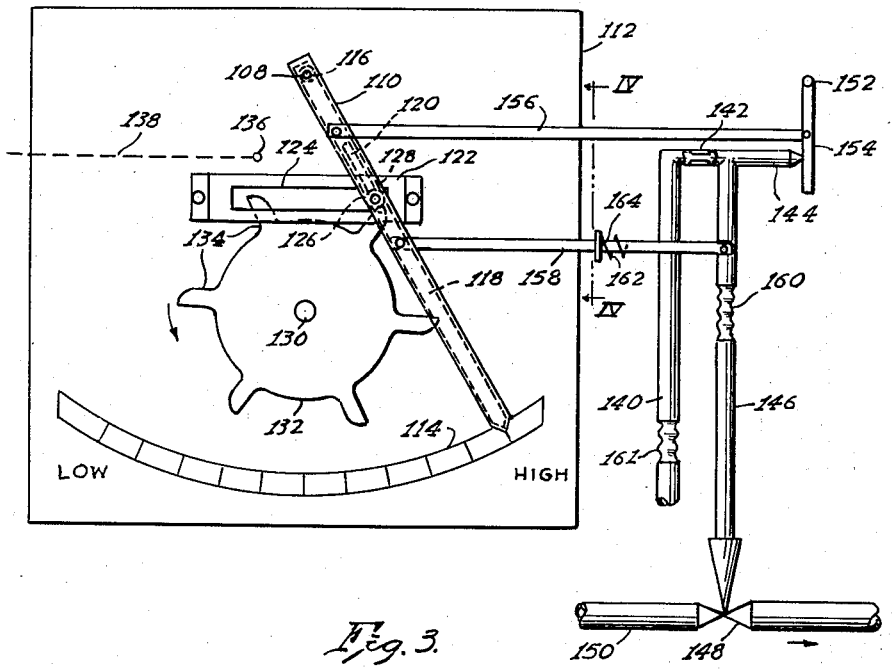

The invention can best be described with reference to the accompanying drawings which form a part of this specification and illustrate a preferred embodiment thereof. In the drawing, Figure 1 is a schematic diagram of a liquid flow system in accordance with my invention. Figure 2 is a sectional representation and in part, a schematic diagram of receptacles to be discharged of their liquid contents and a typical hydrostatic head measuring means associated therewith. Figure 3 is a sectional representation and, in part, a schematic diagram of a typical fluid control means used in controlling the discharge of liquid from the receptacles. Figure 4 is a side view taken in the direction of line IV—IV in Figure 3. Figure 5 is an enlarged sectional representation of a typical flow control valve that can be used in accordance with my invention to control the flow of liquid in the discharge line from the receptacles or flow tanks.

Referring to Figure 1, reference numeral 2 illustrates a cylindrical receptacle or tank wherein liquid 4 is stored for subsequent use in accordance with my invention. In order to fill either of charge tanks 6 and 8, or both, liquid is removed from tank 2 through discharge line 10 containing valve 12 and pumped to the charge tanks through line 14 by pump 16. In order to flow liquid from line 14 into charge tanks 6 and 8, line 14 is provided with lines 18 and 20 containing valves 22 and 24, respectively. Pump 16 is operated by steam introduced therein through line 26 containing valve 28.

The hydrostatic head of the liquid in the charge tanks is continuously measured by manometer 30 through means of lines 32 and 34, leading to the base of the charge tanks and containing valves 36 and 38, respectively, and line 40. The hydrostatic head readings obtained through means of manometer 30 are transmitted by means 42 to instrument 44 which controls the amount of air pressure in line 46 and on control valve 48. In the instant embodiment of my invention, the amount of pressure on control valve 48 determines the amount of steam which will be supplied through steam line 50 to pump 52. The latter pump, located on line 54, removes liquid from tank 6 through line 56 containing valve 58 and/or tank 8 through line 60 containing valve 62. The rate of flow of liquid from pump 52 is governed by the amount of steam supplied thereto by line 50. Line 50 preferably contains a hand valve 51 interposed between control valve 48 and pump 52, which is open sufficiently to permit the free flow of steam to the pump during operation of my invention. The liquid which is removed from the charge tanks by pump 52 is then discharged through line 64 to any desired point.

In order to illustrate an especially preferred embodiment of my invention, reference should be had to Figures 2 to 5 which illustrate an embodiment permitting continuous liquid flow operations. Charge tanks 66 and 68, filled with liquid to any predetermined level by any suitable means, for example as shown in Figure 1, and from which liquid is to be discharged, are provided with discharge lines 70 and 72 having valves 74 and 76, respectively, located therein and a manometer 78 capable of continuously measuring the hydrostatic head of the liquid in either or both of tanks 66 and 68. Manometer 78, which is used herein to illustrate a preferred embodiment of my invention, is a float-type mercury manometer, but it is understood that other types of manometers or devices capable of measuring the hydrostatic head of the liquid in the tanks can also be used in the practice thereof.

Manometer 78 comprises generally a U-shaped tube filled with mercury 80. One side 82 of the manometer, which can be referred to as the low-pressure side, is enlarged and open to the atmosphere, while the other side thereof 84, also enlarged and comprising the high-pressure side, is connected through means of line 86 and lines 88 and 89, containing valves 90 and 92, respectively, to the base of tanks 66 and 68. In the embodiment shown, the liquid in the charge tanks is not permitted direct contact with the mercury in the manometer, but a solution 94, substantially immiscible and chemically and/or physically neutral to both the liquid in the tanks and the mercury in the manometer, such as water, methyl alcohol, etc., is interposed therebetween and stored in part in reservoirs 96 and 98. This expedient is often desirable in cases where the liquid in the tanks can be contaminated by or react with the mercury in the manometer. While leg 82 of the manometer is shown as being open to the atmosphere, if it is desired to maintain the charge tanks at a pressure other than atmospheric, the low-pressure side 82 of the manometer can be piped to the space above the liquid in the charge tanks, and the differential pressure measurement obtained will still be proportional to the hydrostatic head of the liquid in the tanks.

Resting on the mercury in the high-pressure side of manometer 78 is a float 100 provided with a stem 102 at the upper end thereof. One side of the stem is provided with teeth 104 in engagement with a gear 106 mounted in enlarged portion 84 of the manometer by means of a pressure-tight shaft 108.

It is obvious in the present embodiment that as the liquid level in the charge tank and consequently the hydrostatic head thereof varies, the level of the mercury in the manometer will also vary. Thus, as the hydrostatic head of the liquid in the charge tanks changes, float 100, resting on the surface of the mercury, will follow the change in level thereof and transmit its vertical movement through the intermediary of stem 102, gear 106 and shaft 108 to a hydrostatic pressure indicator or arm 110 mounted on panel 112 as shown in Figure 3. Still referring to Figure 3, the hydrostatic head or pressure of the liquid in the tanks can then be read directly from calibrations 114 on the face of panel 112. While I have shown but one specific means for determining the hydrostatic head of the liquid in the charge tanks and obtaining a reading thereof on panel 112, other means could also be used in accordance with my invention to measure the hydrostatic head of the liquid and record the same on panel 112.

Also pivotally mounted on panel 112 on a hollow shaft 116 circumferentially disposed about shaft 108 is an index arm 118 provided with a slot 120. Fixedly attached to panel 112 and with a portion thereof spaced sufficiently away therefrom to permit movement of index arm 118 and a cam, to be hereinafter described, therebehind, is a bar 122 provided with a slot 124 in which rides a roller 126. Roller 126 is provided with a shaft 128 which extends through slot 120 of index arm 118. Rotatably mounted below bar 122 on shaft 130 is a cam 132 herein shown provided with a number of fingers 134 adapted during rotation of the cam to engage shaft 128. Cam 132 can be rotated continuously, or at desired intervals, by any known means such as clock means, electrical means, etc. Pressure indicator 110, index arm 118 and cam 132 are so mounted, as shown in Figure 4, as to move in different planes. Accordingly, no physical contact exists between these various elements. Also mounted on panel 112 are switch means 136 adapted upon contact with index arm 118 to alternately open and close, through electrical circuit means 138, valves 74 and 90 and valves 76 and 92, respectively.

Associated with pressure indicator 110 and index arm 118 is a fluid pressure regulating means for controlling the discharge of liquid from the charge tanks, comprising line 140, provided with a flow restricting throat 142, adapted to admit air or other similar fluid into the system at a predetermined pressure toward nozzle 144 and, through line 146, to flow control valve 148 in line 150. The latter line receives liquid removed from either or both of tanks 66 and 68. Pivotally mounted at 152, adjacent nozzle 144 and usually normal thereto, is a flapper 154 adapted at various times to substantially cover and move toward nozzle 144. Movement of pressure indicator 110 is transmitted to flapper 154 by a suitable linkage, such as a rigid mechanical linkage 156, which is pivotally attached to both pressure indicator 110 and flapper 154. Movement of index arm 118 is transmitted to nozzle 144 by a suitable linkage, such as a rigid mechanical linkage 158, which is pivotally attached at one end to the index arm and the other end to the upper portion of line 146. In order to permit movement of nozzle 144, lines 146 and 140 are provided with flexible joints 160 and 161, respectively. Nozzle 144 is maintained in its normal position, shown in Figure 3, by spring 162, one end of which is attached to linkage 158, with the other end thereof in abutting relationship or attached to a fixed plate-like member 164 disposed about linkage 158.

Flow control valve 148 is such that the opening or closing thereof is controlled by the air pressure in line 146. Referring to Figure 5, which illustrates a typical valve which can be employed in the practice of my invention, valve 148 is a relay operated pressure controlled valve using air or other suitable fluid pressure as the amplifying means and comprises a diaphragm 166 and a plunger or valve stem 168 attached thereto. Valve stem 168 is provided with a valve plug 170 at the free end thereof which is adapted to move toward and away from valve seat 172 and permit or restrict the flow of liquid therethrough. Spring 174, circumferentially disposed about plunger 168, normally tends to maintain valve plug 170 away from opening or valve seat 172.

Operation of the unit in accordance with the preferred embodiment of my invention will now be described to obtain a clear understanding thereof. Tanks 66 and 68 are filled to any desired level by any suitable means. Valves 74 and 90 are opened, while valves 76 and 92 are closed. At this point the design is such that flapper 154 is in substantial engagement with nozzle 144. Air or other fluid under a suitable pressure, say about 3 to about 30 pounds, sufficient to force valve plug 170 in closing engagement with valve seat 172, is introduced in line 140. Since no air escapes through nozzle 144, substantially all of the air pressure is brought to bear upon diaphragm 166, with the result that valve 148 is substantially closed and little or no liquid is permitted to pass therethrough.

Having determined beforehand the desired weight of liquid to be discharged from tank 66 per unit time, and knowing the desired opening necessary in valve 148 to permit the gravity flow of such liquid therethrough, in accordance with the instant embodiment of my invention the amount of air or fluid pressure necessary to obtain the desired opening therein is brought to bear upon diaphragm 166 of valve 148. In essence, this is accomplished by varying the relative relationship between nozzle 144 and flapper 154 in order to obtain the desired pressure in line 146.

In the embodiment shown, cam 132 is rotated at a predetermined speed and in a counter-clockwise direction so that one of fingers 134 contacts shaft 128, which in turn causes roller 126 to move from one end of slot 124 to the left toward the other end of the slot. At the same time, shaft 128 of roller 126, extending through slot 120 of index arm 118, moves the index arm to the left against the action of spring 162, resulting in substantially linear movement of index arm 118 over calibrations 114. The movement of index arm 118 is transmitted to nozzle 144 through linkage 158, whereby the nozzle is moved away from flapper 154. Since air can now escape from nozzle 144 faster than air can enter through flow restricting throat 142, the pressure in line 146, and thus on diaphragm 166, is reduced. With less pressure on diaphragm 166, spring 174 is able to move valve plug 170 partially away from valve seat 172, permitting the flow of some liquid through the valve.

As liquid in tank 66 is withdrawn therefrom and the hydrostatic head thereof is reduced, float 100 on the surface of the mercury in the high-pressure side of the manometer will rise and through means of gear 106 and shaft 108 will result in movement of pressure indicator 110 to the left. This movement, translated through linkage 156, will result in movement of flapper 154 toward nozzle 144. The relative distance between flapper 154 and nozzle 144, however, is maintained throughout the flow period so that the desired pressure necessary to obtain the desired weight rate of flow of liquid from tank 66 is continuously maintained on diaphragm 166. The net result is that pressure indicator 110 will at all times tend to follow and assume the same initial relative position as index arm 118. Thus, as index arm 118 moves from a high-pressure reading on panel 112 to a low-pressure reading in accordance with movement of cam 132, pressure indicator 110 will also move from a high-pressure reading to a low-pressure reading.

As noted, when tank 66 has been discharged of its liquid contents, pressure indicator 110 and index arm 118 have moved to the left on panel 112. Substantially instantaneously upon completion of flow of liquid from tank 66, index arm 118 makes contact with and actuates switch means 136, closing valves 74 and 90 and opening valves 76 and 92. Substantially immediately manometer 78 measures the hydrostatic head of the liquid in tank 68 and pressure indicator 110 moves to the right and with it flapper 154. Cam 132 is so designed in the instant embodiment that substantially at the moment the switch is made from tank 66 to tank 68, the finger 134 which had been in engagement with shaft 128 is freed therefrom and spring 162 returns the index arm to its initial position. Substantially at the moment index arm 118 and pressure indicator 110 have returned to their initial position shown in Figure 3, another of fingers 134 engages shaft 128 and flow of liquid continues this time from tank 68 in the manner similar to the flow from tank 66 described above. During discharge of liquid from tank 68, tank 66 can be refilled and, upon completion of flow of liquid from tank 68, index arm 118 again makes contact with switch means 136, as before, this time opening valves 74 and 90 and closing valves 76 and 92. In this way, the flow of liquid is made substantially continuous.

My invention can still be employed in cases where the weight rate of flow of liquid need not be continuous and two or more charge tanks are not necessary. For example, in the event only the amount of liquid from one tank, say tank 66, is necessary in an operation, thus obviating the need for another tank, upon completion of flow of liquid from tank 66 pressure indicator 110 and index arm 118 can be moved to their original position by any convenient means during the period which tank 66 is being refilled. Thus, upon completion of flow of liquid from tank 66, rotation of cam 132 can be stopped just before finger 134 leaves the surface of shaft 128. Since switch means 136 is not needed for noncontinuous operation, it is rendered ineffective in this case. Valve 74 is closed by hand in order to restrict the flow of liquid therethrough, and tank 66 is filled with liquid, resulting in movement of pressure indicator 110 to the right on panel 112. When flow of liquid from tank 66 is again desired, cam 132 is again started and, upon continuation of rotation, finger 134 leaves the surface of shaft 128, permitting spring 162 to move index arm 118 to the right. Valve 74 is then opened by hand and the flow of liquid from tank 66 is continued as before.

While I have shown a particular cam for moving index arm 118 at a predetermined rate, it is within the scope of my invention to employ other means as well as cam means of other designs for moving the index arm at a predetermined rate to obtain the desired relative movement between nozzle 144 and flapper 154 and the desired pressure in line 146. Thus, a reciprocating element could be mounted in direct contact with index arm 118 and moved at such a rate as to obtain the desired movement in the index arm. Moreover, index arm 118 and its associated cam 132 and linkage means could be eliminated in some cases and a reciprocating element could be mounted in direct engagement with line 146 above flexible joint 160 and moved at such rate to obtain the desired relationship between nozzle 144 and flapper 154.

While the cam illustrated in the specific embodiment has been shown as being of such design and is said to be rotated at such speed to obtain a desired weight rate of flow, it is within the scope of my invention to vary the shape of the cam and its speed to obtain any desired weight rate of flow of liquid from the charge tanks through line 150. Thus, not only can any desired fixed rate of flow of liquid be obtained by designing the cam to advance index arm 118 at a fixed linear rate, but also any desired variable flow pattern can be produced. For example, a flow of 10 pounds of liquid per minute for 30 minutes could be obtained, the flow could be stopped for 5 minutes, after which the operation could be continued with a flow of 20 pounds per minute for 10 minutes. Again, operation could be started with a flow of 5 pounds per minute which could be increased steadily for 3 hours to a final rate of 25 pounds per minute. The pattern could, if desired, be related to the tank contents. For instance, one-fourth of a tank could be discharged uniformly in one hour, another fourth uniformly in the next three-fourths of an hour, and the remainder could be discharged in the next hour.

While I have disclosed method and means for controlling the weight rate of flow of liquid from a tank or receptacle, it is apparent that the invention is also applicable in controlling the weight rate of flow to a tank or receptacle.

Obviously, many modifications and variations of the invention, as hereinabove set forth, can be made without departing from the spirit and scope thereof, and therefore only such limitations should be imposed as are indicated in the appended claims.

I claim:

1. A method of continuously controlling the weight rate of flow of liquid from at least two receptacles, each containing a selected amount of said liquid, which comprises continuously measuring the hydrostatic head of said liquid in one of said receptacles, removing liquid from said one receptacle and controlling the flow of liquid therefrom with a fluid under pressure, continuously varying the pressure of said fluid in accordance with changes in said hydrostatic pressure, substantially immediately upon completion of flow of liquid from said one receptacle continuously measuring the hydrostatic head of said liquid in another of said receptacles, removing liquid from said latter receptacle and controlling the flow of liquid therefrom with a fluid under pressure, continuously varying the pressure of said latter fluid in accordance with changes in said latter hydrostatic head, and continuing the weight rate of flow of liquid from a receptacle containing a selected amount of liquid upon completion of flow of liquid from a receptacle in the manner described above, whereby a continuous operation is obtained.

2. A system for continuously controlling the weight rate of flow of liquid sequentially from at least two receptacles, which comprises at least two receptacles, each provided with a liquid discharge line, means for continuously measuring the hydrostatic head of said liquid in one of said receptacles, pressure actuated means for controlling the rate of flow of liquid from each of said receptacles, means for continuously varying the pressure on said pressure actuated means in accordance with changes in said hydrostatic head, and means adapted substantially immediately upon completion of flow of liquid from said one receptacle to continuously measure the hydrostatic head in another of said receptacles and permit the flow of liquid from said latter receptacle.

3. A system for continuously controlling the rate of flow of liquid from at least one receptacle provided with a liquid discharge line, comprising pressure actuated valve means for controlling the rate of flow of liquid through said discharge line, means for supplying a fluid under pressure to said pressure actuated valve means, and cam operated means for continuously varying said fluid pressure on said pressure actuated valve means, said cam operated valve means comprising a pivotally mounted index arm, a rotatable cam mounted adjacent thereto and adapted upon rotation to move said index arm, a pivotally mounted pressure indicating arm adapted to move in response to change in hydrostatic pressure of said liquid in said receptacle, and means linking said index arm and said pressure indicating arm with said fluid pressure varying means.

4. A system for continuously controlling the rate of flow of liquid from at least one receptacle provided with a liquid discharge line, comprising pressure actuated valve means for controlling the rate of flow of liquid through said discharge line, means for supplying a fluid under pressure to said pressure actuated valve means, movable nozzle means in said fluid supply means adapted to permit escape of fluid from said supply means, movable means mounted adjacent said nozzle means and adapted upon movement thereof to follow said nozzle means and to aid in controlling the escape of said fluid from said nozzle means, and cam operated means directly attached to said nozzle means for continuously adjusting the relative distance between said nozzle and said movable means, whereby the pressure on said pressure actuated valve is continuously varied.

5. A system for continuously controlling the rate of flow of liquid from at least one receptacle provided with a liquid discharge line, comprising pressure actuated valve means for controlling the rate of flow of liquid through said discharge line, means for supplying a fluid under pressure to said pressure actuated valve means, nozzle means in said fluid supply means adapted to permit escape of said fluid therefrom, movable means mounted adjacent said nozzle means and adapted upon movement thereof to aid in controlling the escape of said fluid from said nozzle means, a pivotally mounted index arm, a rotatable cam mounted adjacent thereto and adapted upon rotation to move said index arm, and a pivotally mounted pressure indicating arm adapted to move in response to change in hydrostatic pressure of said liquid in said receptacle, said index arm and said pressure indicating arm adapted upon movement to vary the relative distance between said nozzle means and said movable means, whereby the pressure on said pressure actuated valve is continuously varied.

6. A system for continuously controlling the rate of flow of liquid from at least one receptacle provided with a liquid discharge line, comprising pressure actuated valve means for controlling the rate of flow of liquid through said discharge line, means for supplying a fluid under pressure to said pressure actuated valve means, nozzle means in said fluid supply means adapted to permit escape of said fluid therefrom, pivoted means mounted adjacent said nozzle means and adapted upon movement thereof to aid in controlling the escape of said fluid from said nozzle means, a pivotally mounted index arm, a rotatable cam mounted adjacent thereto and adapted upon rotation to move said index arm, a pivotally mounted pressure indicating arm adapted to move in response to change in the hydrostatic pressure of said liquid in said receptacle, means in said fluid supply means to permit pivotal movement of said nozzle means, means linking said index arm with said nozzle means, and means linking said pressure indicating arm and said pivoted means, whereby the pressure on said pressure actuated valve is continuously varied.

7. A system for continuously controlling the rate of flow of liquid from at least one receptacle provided with a liquid discharge line, comprising pressure actuated valve means for controlling the rate of flow of liquid through said discharge line, means for supplying a fluid under pressure to said pressure actuated valve means, nozzle means in said fluid supply means adapted to permit escape of said fluid therefrom, pivoted means mounted adjacent said nozzle means and adapted upon movement thereof to aid in controlling the escape of fluid from said nozzle means, a pivotally mounted index arm, a rotatable cam mounted adjacent thereto and adapted upon rotation to move said index arm, a pivotally mounted pressure indicating arm, manometer means for measuring the hydrostatic head of said liquid in said receptacle and causing movement of said pressure indicating arm upon change of said hydrostatic head, flexible means in said fluid supply means to permit pivotal movement of said nozzle means, mechanical means pivotally mounted to each of said index arm and said nozzle means, and mechanical means pivotally mounted to each of said pressure indicating arm and said pivoted means, whereby the pressure on said pressure actuated valve is continuously varied.

8. A control device comprising means for supplying a fluid under pressure, movable nozzle means in said fluid supply means adapted to permit escape of fluid from said supply means, movable means mounted adjacent said nozzle means and adapted upon movement thereof to follow said nozzle means and to aid in controlling the escape of said fluid from said nozzle means, and cam operated means directly attached to said nozzle means for continuously adjusting the relative distance between said nozzle and said movable means.

9. A control device comprising means for supplying a fluid under pressure, nozzle means in said fluid supply means adapted to permit escape of said fluid therefrom, pivoted means mounted adjacent said nozzle means and adapted upon movement thereof to aid in controlling the escape of said fluid from said nozzle means, a pivotally mounted index arm, a rotatable cam mounted adjacent thereto and adapted upon rotation to move said index arm, a pivotally mounted pressure indicating arm adapted to move in response to an external force, means in said fluid supply means to permit pivotal movement of said nozzle means, means linking said index arm with said nozzle means, and means linking said pressure indicating arm and said pivoted means.

10. A control device comprising means for supplying a fluid under pressure, nozzle means in said fluid supply means adapted to permit escape of said fluid therefrom, pivoted means mounted adjacent said nozzle means and adapted upon movement thereof to aid in controlling the escape of fluid from said nozzle means, a pivotally mounted index arm, a rotatable cam mounted adjacent thereto and adapted upon rotation to move said index arm, a pivotally mounted pressure indicating arm, manometer means for measuring the hydrostatic head of liquid in a receptacle and causing movement of said pressure indicating arm upon change of said hydrostatic head, flexible means in said fluid supply means to permit pivotal movement of said nozzle means, mechanical means pivotally mounted to each of said index arm and said nozzle means, and mechanical means pivotally mounted to each of said pressure indicating arm and said pivoted means.

References Cited in the file of this patent
UNITED STATES PATENTS

| | | |
|---|---|---|
| 1,370,641 | Grant | Mar. 8, 1921 |
| 1,826,112 | Wilson | Oct. 6, 1931 |
| 2,258,360 | Helzer | Oct. 7, 1941 |
| 2,314,899 | Samiran | Mar. 30, 1943 |
| 2,418,858 | Urquhart | Apr. 15, 1947 |
| 2,504,304 | Cowan | Apr. 18, 1950 |
| 2,509,629 | De Giers et al. | May 30, 1950 |
| 2,517,718 | Sall | Aug. 8, 1950 |